(12) United States Patent
Hernandez

(10) Patent No.: US 11,386,242 B2
(45) Date of Patent: Jul. 12, 2022

(54) PAYMENT TERMINAL SECURITY DEVICE COMPRISING AN EMBEDDED SECURITY ELEMENT

(71) Applicant: Banks and Acquirers International Holding, Paris (FR)

(72) Inventor: Vincent Hernandez, Claveyson (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 747 days.

(21) Appl. No.: 16/377,905

(22) Filed: Apr. 8, 2019

(65) Prior Publication Data

US 2019/0311159 A1 Oct. 10, 2019

(30) Foreign Application Priority Data

Apr. 9, 2018 (FR) ...................................... 1853073

(51) Int. Cl.
| | |
|---|---|
| *G06F 21/88* | (2013.01) |
| *G06F 21/86* | (2013.01) |
| *G06F 21/83* | (2013.01) |
| *G07F 7/08* | (2006.01) |
| *H01L 25/00* | (2006.01) |
| *H05K 7/02* | (2006.01) |

(52) U.S. Cl.
CPC .............. *G06F 21/88* (2013.01); *G06F 21/83* (2013.01); *G06F 21/86* (2013.01); *G07F 7/0873* (2013.01); *H01L 25/00* (2013.01); *H05K 7/02* (2013.01); *H01L 2225/06582* (2013.01)

(58) Field of Classification Search
CPC .......... G06F 21/88; G06F 21/83; G06F 21/86; H05K 1/11; H05K 1/16; H05K 1/18; H05K 1/182
USPC ............. 361/760, 748, 679.01, 600; 235/375
See application file for complete search history.

(56) References Cited

U.S. PATENT DOCUMENTS

| | | | |
|---|---|---|---|
| 8,497,444 B2 | 7/2013 | Eck et al. | |
| 8,662,394 B2 | 3/2014 | Bonnet et al. | |
| 2005/0059859 A1* | 3/2005 | Konstorum | ............ A61B 1/012 600/130 |

(Continued)

FOREIGN PATENT DOCUMENTS

| | | |
|---|---|---|
| EP | 2146562 A1 | 1/2010 |
| FR | 2929042 A1 | 9/2009 |

OTHER PUBLICATIONS

French Search Report dated Oct. 19, 2018 for corresponding French Application No. 1853073, filed Apr. 9, 2018.

(Continued)

*Primary Examiner* — Edwyn Labaze
(74) *Attorney, Agent, or Firm* — David D. Brush; Westman, Champlin & Koehler, P.A.

(57) ABSTRACT

A security device for an electronic payment terminal having at least one printed circuit. The security device includes at least one deformable security element designed to be inserted in a housing of the printed circuit. The printed circuit has at least one security circuit including at least one conducting track internal to the printed circuit and interrupted at the housing. Furthermore, the at least one deformable element has at least one conducting surface configured to close the at least one internal conducting track when the deformable element is deformed in the housing.

12 Claims, 2 Drawing Sheets

(56) References Cited

U.S. PATENT DOCUMENTS

2011/0221651 A1\* 9/2011 Christie ................ H01Q 11/08
343/905

OTHER PUBLICATIONS

English translation of the Written opinion dated Oct. 19, 2018 for corresponding French Application No. 1853073, filed Apr. 9, 2018.

\* cited by examiner

PAYMENT TERMINAL SECURITY DEVICE COMPRISING AN EMBEDDED SECURITY ELEMENT

1. FIELD OF THE INVENTION

The field of the invention is electronic devices and more particularly data entry devices such as electronic payment terminals.

The invention is more precisely related to the security of such data entry devices faced with attempted intrusions with the objective of fraudulently obtaining confidential data (confidential code numbers, card data, etc.).

2. PRIOR ART

Since electronic payment terminals deal with sensitive data, particularly bank data, it is essential to protect them against attempted fraud, for example such as the introduction of a spy device into the keyboard of such electronic payment terminals.

Hardware and/or software protection measures are available to achieve this.

Hardware protection measures include particularly techniques designed to detect if the shell/cover/casing of the electronic payment terminal is opened, for example by the use of elastomer "dummy keys" associated with "carbon pads" or "metal domes".

Conventionally, an electronic payment terminal comprises an upper half-shell and a lower half-shell. The upper half-shell comprises openings, for example through which keyboard keys and the terminal display screen can project.

At the keyboard, the "dummy key" devices are used to detect an attempt to separate the upper half-shell and the lower half-shell. The "dummy keys" placed on the printed circuit board are under permanent pressure when the electronic payment is assembled, for example by means of a compression part extending from the inside of the upper half-shell. This pressure on the "dummy keys" sets up an electrical contact between the "carbon pad" or the "metal dome" and the printed circuit board, causing a security circuit on the surface of the board to close.

If the electronic payment terminal is disassembled, the pressure applied on the "dummy keys" is reduced and the electrical contact is broken, thus leading to detection of an attempted fraud.

This solution known in prior art is generally effective enough. However, there are ways of bypassing the protection provided by the "dummy keys", for example by injection of a conducting liquid between the printed circuit board and the "dummy keys", making a permanent electrical contract, thus neutralising detection of opening of the electronic payment terminal.

Furthermore, the efficiency of these "dummy keys" reduces with time due to degradation caused for example by physical forces and deterioration of the carbon.

It is also necessary to use several "dummy keys", for example on each face of the printed circuit, if it is required to be able to detect an attempted intrusion initiated from any side of the electronic payment terminal.

Therefore there is a need for a technique for securing electronic devices used for inputting or reading sensitive data that is reliable and durable in the long term, easy to use and that makes it possible to neutralise fraudulent techniques to bypass existing security devices.

3. SUMMARY

This proposed technique is capable of partly solving problems that arise in prior art. This technique applies to a security device for an electronic payment terminal comprising at least one printed circuit.

According to the disclosed technique, the security device comprises at least one deformable security element designed to be inserted in a housing of the printed circuit, the printed circuit comprising at least one conducting track internal to the printed circuit and interrupted at the housing, and the deformable element has at least one conducting surface configured to close the internal conducting track when the deformable element is deformed in the housing.

The invention thus discloses a new and inventive technique for securing an electronic payment terminal making use of a deformable security element inserted in a housing in the printed circuit of the electronic payment terminal.

When the security element is deformed, it closes a security circuit internal to the printed circuit, and when it returns to its initial shape (for example following an intrusion attempt that changes the pressures applied to the deformable element), the security circuit is opened so that an intrusion attempt in the electronic payment terminal can be detected.

To achieve this, the security circuit comprises at least one security track formed inside the printed circuit and not opening up on the surface, making an attempted access to this security track, for example by injection of a conducting liquid on the surface of the printed circuit, more difficult. Therefore, the security circuit is closed from inside the printed circuit and no longer on the surface of the circuit as is the case in prior art.

Therefore, to achieve this, a housing is provided in the printed circuit in which the internal security circuit is interrupted, and the security track is divided into several track portions. Therefore unlike prior art, the security circuit is not flush with the surface of the printed circuit.

These track portions are then brought into contact by deformation of a deformable security element with at least one conducting surface that comes into contact with track portions when the deformable security element is inserted in the housing and deformed.

When an intrusion attempt is made by which the deformable element returns to its initial shape, the security circuit is no longer closed and the attempted intrusion is detected.

According to one particular aspect, the deformable security element is designed to deform in the housing through a means forming part of the group composed of:

deformation by assembly of a component on the printed circuit above the deformable security element inserted in the housing;

deformation by insertion of an attachment means inside the deformable security element inserted in the housing;

compression by assembly of the electronic payment terminal.

When the deformable element is compressed under a component or under assembled half-shells of the electronic payment terminal or when an attachment element (for example a screw) is inserted inside it, it tends to become wider and to occupy the entire space inside the housing, which creates contact between its conducting surface and track portions and thus closes the security circuit.

When an attempted intrusion is made and the terminal or component is removed, the pressure applied on the deformable element is reduced and it tends to return to its initial shape, which opens the security circuit.

Similarly, when an attempted intrusion is made by disassembling the attachment means inserted in the security device, the deformable element tends to return to its initial shape, thus opening the security circuit.

According to one particular aspect, at least part of the deformable element is made of an elastomer.

The elastomer makes it easier for the deformable element to be deformed, without requiring application of high pressure. This thus enables deformation by simply assembling a component located above the housing in which the deformable element is inserted.

According to another particular aspect, the housing and the deformable security element are approximately cylindrical in shape.

This enables a uniform deformation of the deformable security element, thus optimising closing of the security circuit. In this way, the conducting surface of the deformable security element can be located on the outside of the cylinder, so as to come into contact with the conducting tracks of the security circuit when the cylinder is widened under the pressure applied to it.

According to one particular aspect, the housing is a through hole.

Forming a housing passing through the printed circuit with a security device flush with the surface on each side of the printed circuit when it is inserted in the housing can limit the number of security devices. Indeed, a single security device can detect an intrusion by opening one of the covers of the electronic payment terminal, in other words when the pressure applied to it on one of the faces of the printed circuit is relaxed.

According to one particular aspect, the security device comprises two deformable elements each of which has at least one conducting surface, said two deformable elements being configured to be inserted one above the other in the housing.

It is useful to use two deformable elements to assure electrical continuity of at least two distinct security circuits placed on different layers of the printed circuit, one deformable element at least closing a circuit formed in a layer.

According to one particular aspect, the two deformable elements are in contact through a non-conducting surface.

Thus, the two deformable elements can independently close the at least two security circuits formed in each of the layers of the printed circuit, because the contact surface between them is insulating. At least two independent security circuits are thus formed positioned on the different levels of the printed circuit.

According to one particular aspect, the printed circuit comprises two coplanar security circuits each comprising at least one conducting security track internal to the printed circuit and interrupted at the housing and the deformable element has at least one conducting surface configured to close the conducting track of each of the two coplanar security circuits when the deformable element is deformed.

Thus, according to this embodiment, when two security circuits are included in the printed circuit, interrupted at the housing, the one or more deformable elements enable closing of these two circuits. If two deformable elements are used, it is possible to detect which circuit is open and thus to more precisely define the side of the payment terminal being attacked.

According to one particular aspect, the deformable security element comprises a flange at one of its ends, the flange being designed to cover the housing on the surface of the printed circuit when the deformable security element is inserted in the housing.

Thus according to this embodiment, the flange can optimise the seal of the security device on the surface of the printed circuit and thus make it more difficult if not impossible to neutralise the security device (for example by injection of a conducting liquid) or to fraudulently remove it from the housing in which it is inserted.

According to one particular aspect, the two deformable elements are in contact through a conducting exchange surface when the two deformable elements are deformed in the housing.

Thus, the two deformable elements behave like a single deformable element, by jointly closing the at least two security circuits formed in the different layers of the printed circuit. The flanges of each of the two deformable elements can be used to assure that the front conducting surfaces of the two elements remain discontiguous as long as the security device is not compressed. According to one variant embodiment, one of the two deformable elements could be active with a conducting zone and the other can be passive and non-conducting, the conducting part of the active device being placed facing the security circuit so as to close when the two deformable elements are compressed.

According to one particular aspect, the security device is covered with a flexible mesh.

Thus, access to the security device is made more complex, and security of the electronic payment terminal is increased. Furthermore, such a flexible mesh can be used before the security device is deformed and remain fully efficient after deformation of the security device because it can itself be deformed without damage.

Finally, the disclosed technique also relates to an electronic payment terminal comprising at least one security device as described above, according to different embodiments.

4. FIGURES

Other characteristics and advantages will become clearer after reading the following description of particular embodiments of the disclosure given as simple illustrative and non-limitative examples, and the appended drawings among which:

5. DESCRIPTION

Figure 1:
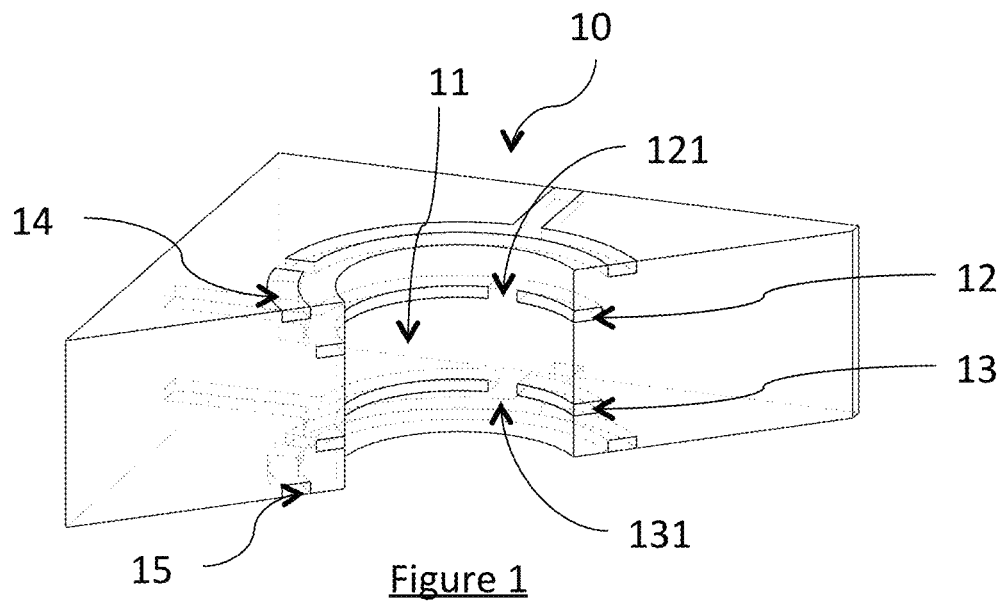
FIG. 1 is a three-dimensional and sectional view of a portion of printed circuit comprising two internal security circuits, each formed from a security track interrupted at a housing passing through the printed circuit.

The general principle of the proposed technique consists of securing a data entry device, for example an electronic payment terminal, by means of at least one deformable security element with a conducting surface, embedded/inserted in a housing in the printed circuit of the data entry device, so as to close one or several security circuits formed inside the printed circuit when it is deformed.

Each security circuit comprises one or several security tracks interrupted at a housing, or hole, formed in the printed circuit and in which the deformable element is inserted. Furthermore, in a known manner, for example in an electronic payment terminal, each security circuit is connected to a security module capable of detecting an intrusion attempt in the electronic payment terminal when one or several security circuits is or are open.

When the deformable element is deformed, for example under the effect of sufficient pressure, its conducting surface comes into contact with the track(s) and closes the corresponding security circuit(s) inside (in other words in the thickness of) the printed circuit. Therefore the general principle of the proposed technique is based on the fact that this deformation is obtained when the data entry device is in a normal functioning situation, and a relaxation of the pressure (so that the deformable element returns to its initial shape) indicates an attempted intrusion into the data entry device. Thus, the deformable element must be deformed during normal operation and an intrusion is detected when it returns to its initial undeformed shape and thus no longer closes the security circuit(s).

The deformable security element may be deformed in several different manners depending on the different embodiments of the invention described below, for example such as:
  closing the data entry device by assembling its upper and lower covers;
  placing a component on the surface of the printed circuit, above the housing in which the deformable element is inserted;
  inserting a means inside the deformable element (for example an assembly screw) for the attachment of an element/component of the data entry device, on the printed circuit.

Thus, when the data entry device is disassembled from its covers, or half-shells, the deformable element returns to its initial "rest" state, which opens the security circuit(s) so that an attempted intrusion can be detected.

One of the advantages of this technique over existing techniques for creating security lies in the fact that the security circuits are difficult to access because they are located in internal layers of the printed circuit and no longer on the surface.

In particular in the case in which an attacker attempts to inject a conducting liquid in the data entry device so as to neutralise the security circuits, embedding the deformable element in the housing can assure that the security device is sealed and therefore make injection of the liquid inoperative.

In the following, embodiments are described in particular in which the data entry device is an electronic payment terminal but the disclosed technique is applicable to any data entry device aimed at solving the same security problems, according to its different embodiments.

FIG. 1 illustrates a portion of a printed circuit 10 of an electronic payment terminal conventionally with an upper half-shell, or upper cover, and a lower half-shell, or lower cover (not shown).

The printed circuit 10 comprises an open housing 11, formed to pass through the thickness of the printed circuit 10, for example at the keyboard, the display, the card reader, etc., in other words any zone of the electronic payment terminal in which there are data to be protected, or in free spaces of the terminal in which spy devices could be installed, or to detect attempts to remove the electronic payment terminal from its place of installation (case of a fixed mounting on a distributor or on a counter).

In the example illustrated on FIG. 1, two security circuits 12, 13 each formed from a security track are provided inside the printed circuit 10. In other words, the security tracks are provided in the internal layers of the printed circuit 10, in its thickness, and are not exposed on the surface of the printed circuit 10 as is the case in prior art.

The two security circuits 12, 13 are coplanar, in other words each extends in a plane corresponding to an internal layer of the printed circuit, the different internal layers being parallel to each other.

For example, the security tracks are made from copper layers etched in the printed circuit 10, for example by a photochemical process as for the other tracks on the printed circuit, and they are interrupted at the housing 11. A metallisation phase (conventionally used to make metallised holes) can be used to improve the quality of the surface in contact inside the housing 11.

More precisely, in the example illustrated, each track follows the circumference of the housing 11, while remaining flush with its vertical wall so as to be accessible, and is interrupted in an "insulating" zone 121, 131, thus forming several portions of tracks not connected to each other.

Other "insulating" zones could be provided in the tracks around the periphery of the housing 11.

In a known manner, the printed circuit 10 comprises another type of circuit composed of partially metallised conducting tracks called a guard ring 14, on its lower and upper surfaces respectively. These guard rings 14 provide additional security so that it can be detected if a contact is made on the surface of the printed circuit 10, for example in the case in which a conducting liquid is injected thus closing the circuit to neutralise the security device making use of techniques according to prior art.

The cylindrical shape of the housing illustrated on this FIG. 1 allows optimising the operating efficiency of the security device because the deformable security element that is inserted in it, that is also cylindrical in shape, can deform uniformly and thus efficiently close the security circuit(s). Obviously, any other shape, for example oblong, of the housing and the deformable element that can satisfy the problem is possible, also depending on installation constraints of components on the printed circuit, the position of this printed circuit inside the electronic payment terminal, etc. It should be noted that the housing can be made by drilling or milling, which can give rounded corners so that the shape of the deformable element can be as close as possible to the shape of the profile of the housing in which it is inserted.

Figure 2:
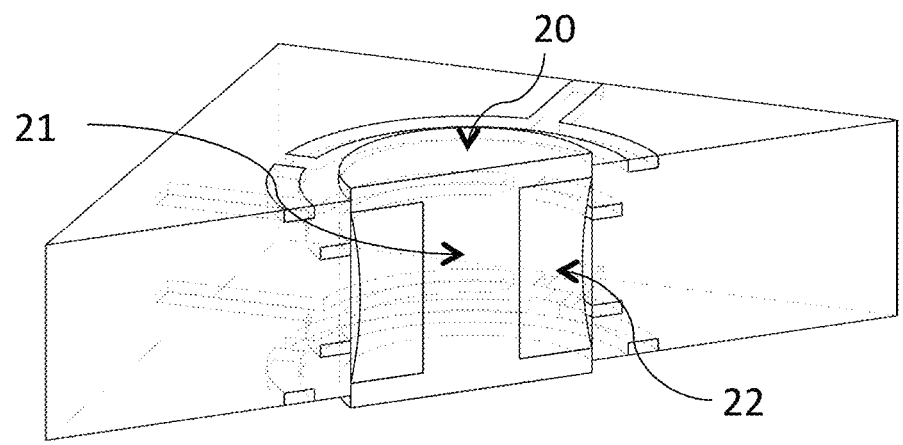
FIGS. 2 and 3 are three-dimensional and sectional views of the portion of printed circuit illustrated in FIG. 1 comprising a security device inserted in the housing, with at least one deformable element that is shown in the "at rest" state (FIG. 2) and in the compressed state (FIG. 3), according to a first embodiment of the invention.
Figure 3:
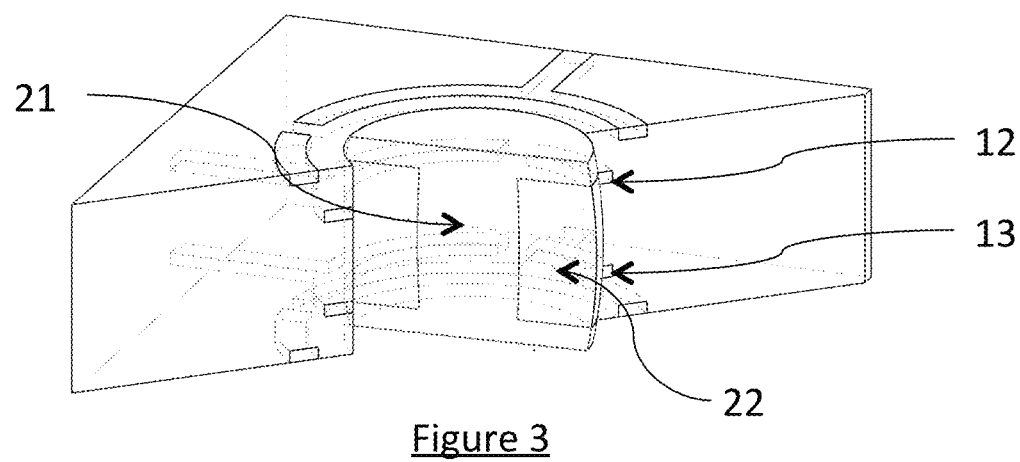

FIGS. 2 and 3 illustrate a first embodiment of a security device 20 corresponding to a deformable security element 20 inserted in the housing 11 described above with reference to FIG. 1.

Therefore, according to this particular embodiment, this deformable security element 20 is approximately cylindrical in shape and comprises a first insulating central part 21 (for example made of silicone with no filler material) corresponding to a support (shown in the example as an "H" section when the printed circuit is looked at vertically) to assure that the second conducting part 22 (for example made of carbon filled silicone) is held in place, covering the first part 21 over part of its height and a part of its circumference.

The two parts 21, 22, for example insert moulded or assembled, are made of elastomer (for example silicone) and are therefore deformable.

If the parts 21 and 22 are insert moulded, when a compression force is applied to the deformable element 20, the elastomer part 22 deforms by "swelling" like a barrel; its height reduces while its circumference increases, the part 21 also being deformed as a result.

If the parts 21 and 22 are assembled, when a compression force is applied to the deformable element 20, it is deformed taking on an annularly grooved shape with several compression corrugations; in this case also its height reduces while its circumference increases. This alternative has the advantage of giving better leak tightness for conducting liquids.

Therefore the two "positions" of the deformable element are illustrated in FIG. 2, at "rest" and in FIG. 3, deformed respectively, if the parts 21 and 22 are insert moulded.

As mentioned above, the first part 21 is insulating, for example is made of silicone with no filler material, while the second part 22 is conducting. This second part 22 may for example be made by moulding a material containing a filler (for example silicone with carbon filler) and then placed in the mould in which the material without filler for the part 21 is moulded, ready for insert moulding.

According to another variant, the filled part 22 is cut from the conducting material before being insert moulded.

The part 22 thus has a conducting surface that, when the deformable element 20 is inserted in the housing and is deformed (for example compressed), closes the security circuits 12 and 13 at positions 121 and 131 illustrated in FIG. 1.

As mentioned above, FIG. 2 represents the security device 20 in its "rest" position, in other words its position before deformation, in this case by assembling the two half-shells of the electronic payment terminal (not illustrated).

The peripheral conducting surface of the part 22 is set back from the walls of the housing 11 and the security circuits 12, 13 are then open. Furthermore, the ends of the support 21 (in this case corresponding to the two sides of the "H") are slightly raised above the lower and upper surfaces of the printed circuit 10.

FIG. 3 represents the security device 20 when it is deformed, for example when the electronic payment terminal is assembled in its normal "usage" configuration.

The upper and lower surfaces of the support 21 are compressed under two bearing elements (not shown) on each side of the housing 11, in the same plane as the lower and upper surfaces of the printed circuit 10. Compression forces are transmitted to the part 22, causing its deformation and bringing its peripheral surface into contact with the track portions of the security circuits 12, 13 exposed on the inside surface of the housing 11. The security circuits 12, 13 are then closed.

The bearing elements that compress the security device are for example composed of the upper and lower half-shells of the electronic payment terminal, or by one or another of the components mounted on the printed circuit 10, as described below with regard to a variant of the first embodiment illustrated in FIG. 4.

Figure 4:
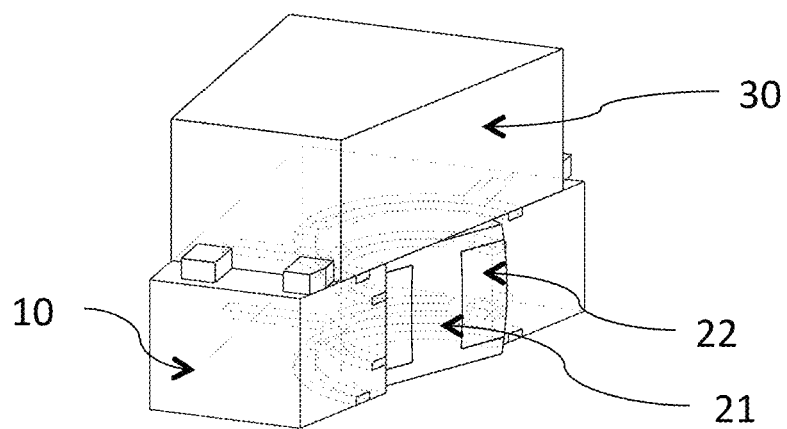
FIG. 4 is a three-dimensional and sectional view of the portion of printed circuit illustrated in FIG. 1 comprising a security device inserted in the housing, with at least one deformable element, according to a variant of the first embodiment of the invention, in which the deformable element is compressed under the pressure of a component.

Therefore FIG. 4 illustrates a variant of this first embodiment in an example of a bearing element 30 mounted on the printed circuit, above the housing in which a security device is inserted as illustrated in FIGS. 2 and 3. Therefore component 30 applies pressure on the deformable element 20 and drives deformation of the part 22, thus closing the security circuits 12 and 13 as described above.

According to another variant (not illustrated), the housing 11 can be not open, or blind, for example formed in an "I/O" cache" type device that consists of an additional security device soldered to the surface of the printed circuit, designed to protect one or several sensitive components, for example such as the connections of a card reader or a security device.

Figure 5:
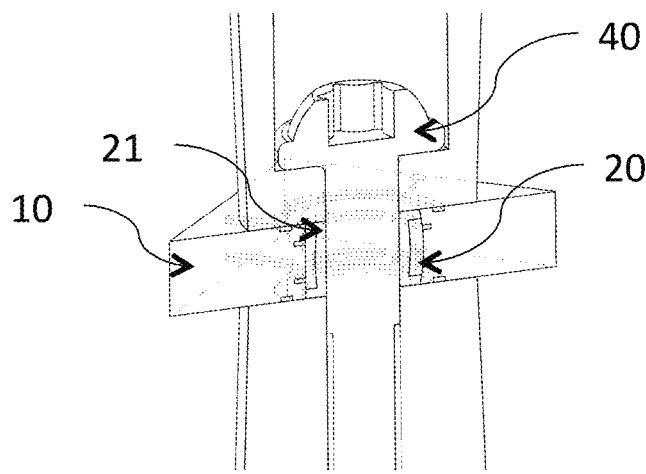
FIG. 5 is a three-dimensional and sectional view of the portion of printed circuit illustrated in FIG. 1, comprising a security device inserted in the housing, with at least one deformable element, according to a second embodiment in which an attachment device passes through the security device.

According to a second embodiment illustrated in FIG. 5, the support 21 of the security device 20 is provided with a passage through which an attachment means can be fixed, for example a screw 40 designed to assemble two parts, or two components, of the electronic payment terminal on each side of the printed circuit 10. Insertion of this attachment means into the deformable security element causes its deformation inside the housing and thus closes the security circuits concerned, as described above.

Figure 6:
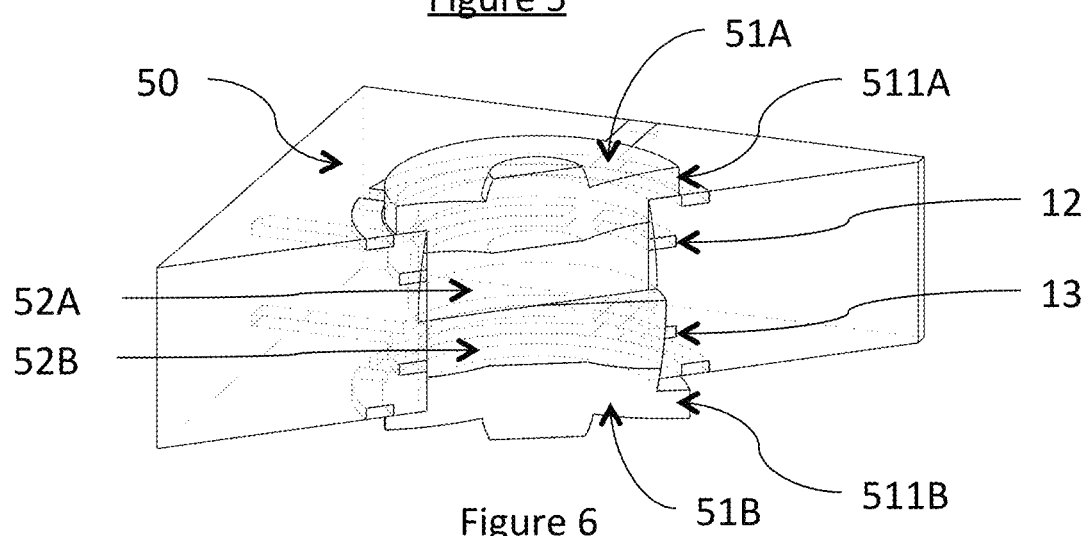
FIG. 6 is a three-dimensional and sectional view of the portion of printed circuit illustrated in FIG. 1, comprising a security device inserted in the housing, with at least two deformable elements placed one above the other, according to a third embodiment of the invention, in which the deformable elements are "compressed".

FIG. 6 illustrates a third embodiment of the security device embedded into the housing 11, in which the security device 50 comprises two deformable security elements 52A, 52B, each approximately cylindrical in shape.

These deformable security elements 52A, 52B are arranged one on the other along a longitudinal axis of the housing 11, in other words along an axis passing through the printed circuit 10 from bottom to top. The height of each deformable security element 52A, 52B is equal to approximately half the height of the deformable security element 20 described in the first and second embodiments, but it could be otherwise (two deformable elements with different sizes).

These deformable security elements 52A, 52B also comprise a conducting peripheral surface similar to that found in the first and second embodiments.

Two end "supports" 51A, 51B, having a generally cylindrical shape 511A, 511B and fitted with a flange are symmetrically arranged on each side of the elements 52A, 52B, along said longitudinal axis of the housing 11. The diameter of these flanges 511A, 511B is larger than the diameter of the housing 11 and once positioned, can cover the housing so as to improve the seal of the device and make it more secure against attacks.

In the case of a blind housing 11, only one "support" element fitted with a flange is used.

The deformable security elements 52A, 52B and the end "support" elements 51A, 51B are deformable, and more precisely compressible.

In this embodiment, the elements 52A, 52B also deform under the effect of a compression force by "swelling"; their height decreases while their circumference increases.

Thus, the peripheral surface of each of these elements 52A, 52B comes into contact with track portions of security circuits 12, 13 flush with the internal periphery of the housing 11, which closes the security circuits 12, 13.

According to a first aspect, the elements 52A, 52B are in contact with each other through a conducting surface when the security element is compressed. The flanges 511A, 511B assure that the front conducting surfaces of the two elements 52A, 52B remain discontiguous as long as the security element is not under pressure. Thus, when compression is applied, the two security circuits 12, 13 are closed jointly by the two elements 52A, 52B because current circulates between the conducting peripheral surfaces of each element 52A, 52B.

According to a second aspect, the elements 52A, 52B are in contact with each other through an insulating surface. In this case, the security circuits 12, 13 are independent because current does not circulate between the peripheral conducting surfaces of each element 52A, 52B. The fact that the two circuits 12, 13 are independent makes it difficult to neutralise one or the other. Therefore the two superposed circuits 12, 13 mutually protect each other. Opening, grounding and short circuiting of the circuits 12, 13 can be monitored jointly, which makes attacks more complicated to make.

According to another aspect, not illustrated, the security device 20, 50 can be covered with a flexible mesh, for example a flexible printed circuit covered by a plurality of nested conducting tracks, bonded to the security device before the two half-shells of the electronic payment terminal are assembled together. Such a flexible mesh can deform without losing any efficiency and can therefore be placed on the printed circuit when the deformable security element(s) is (are) in the "rest" position and then match the surface of the printed circuit once the deformable element(s) is (are) in the "compressed" position in the housing. Therefore the purpose of this mesh is to improve protection of the access to the security device.

On the other hand, the flexible mesh alone is not sufficient to reach the forces necessary to compress the security device 20, 50. However, a bearing support can be provided on one of the covers of the electronic payment terminal, external to the security device and facing this security device. Thus, if a frauder attempts to maintain compression by bonding this bearing support, the bond will be made on the flexible mesh and will not provide sufficient bearing support to compress the security device 20, 50 and close the security circuits 12, 13.

This configuration thus makes it even more difficult to implement attacks.

This new approach towards securing an electronic payment terminal has several advantages over techniques according to prior art.

One of the advantages lies in the position of the security circuits 12, 13 at the internal layers of the printed circuit 10, which makes these circuits less accessible and therefore more difficult to neutralise.

Another advantage lies in the particular configuration of a housing opening up on the two surfaces of the printed circuit, so that an intrusion attempt from either face of the printed circuit can be detected. For example, if an attacker attempts to open the payment terminal, for example by removing the upper half-shell or the lower half-shell, the security device is no longer compressed and returns to its initial state, thus opening one of the security circuits 12, 13. Thus; the security device is no longer compressed regardless of which half-shell is removed, unlike prior art that can only detect removal of the half-shell for example on the side on which a "dummy key" is installed.

Due to this disclosed technique, it is then no longer necessary to use several security devices, for example one on each side of the printed circuit, to reliably secure the electronic payment terminal.

Furthermore, if an attacker attempts to inject a conducting liquid on the surface of the printed circuit 10 in order to neutralise the electric contacts, and therefore the security device before removing the terminal, the deformable security element(s) 20, 52A, 52B behave like an insulating terminator when it is (they are) compressed and "swell" inside the housing 11, thus preventing liquid from penetrating in the housing 11 and coming into contact with the tracks of the security circuits 12, 13. Consequently, if the attacker then disassembles the terminal, the security circuits 12, 13 open when the deformable element resumes its initial shape when the pressure applied to it is relaxed, and the attempted intrusion can be detected.

Furthermore, while a minimum force had to be applied with solutions according to prior art to make contact between the "dummy key" and the printed circuit board, forces are lower with the solution according to the invention, or in all cases forces are lower than minimum forces required in prior art so that the security element is deformed and comes into contact with the conducting tracks 12, 13. Thus is particularly due to the fact that, due to its flexibility, the elastomer from which the security element is made deforms more easily than "dummy key" materials according to prior art.

Thus, compression of the elastomer element 22 only requires full force when the electronic payment terminal is being closed, during assembly of the two shells of the terminal.

For example, according to the invention, a compression force of less than 200 gF is sufficient to deform the deformable element to a deformation of about 0.9 mm, although in prior art a force of about 300 gF was necessary to activate the metallic dome requiring a deformation of between 0.9 and 1.4 mm, depending on the hardness of the elastomer.

If the element 22 is placed under a component, the force generated by installing the component remains limited to deformation of the elastomer and not to its compression, but can deform it sufficiently to close the security circuits 12, 13.

Therefore the force necessary to hold the electrical contact by deformation of the deformable security element is less than it is in solutions according to prior art. The solution is thus more reliable in the long term because forces applied to the deformable security element are lower, not necessarily leading to full compression, and therefore its deformation capacity is less likely to vary in the long term.

Obviously, the proposed technique is not limited to the embodiments described above and given only as examples. It comprises various modifications, alternative forms and other variants that could be envisaged by an expert in the subject in order to solve the problem that arises and particularly all combinations of the different functioning modes described above, that can be taken separately or combined with each other.

The invention claimed is:

1. A security device for an electronic payment terminal comprising at least one printed circuit, wherein said security device comprises:
   at least one deformable security element configured to be inserted in a housing of said printed circuit, said printed circuit comprising at least one security circuit comprising at least one conducting track internal to said printed circuit and interrupted at said housing,
   wherein said at least one deformable element has at least one conducting surface configured to close said at least one internal conducting track when said deformable element is deformed in said housing.

2. A security device according to claim 1, wherein said at least one deformable security element is designed to deform in said housing through a means forming part of the group consisting of:
   deformation by assembly of a component on said printed circuit above said deformable security element inserted in said housing;

deformation by insertion of an attachment element inside said deformable security element inserted in said housing;

compression by assembly of said electronic payment terminal.

3. The security device according to claim 1, wherein at least part of said at least one deformable element is made of elastomer.

4. The security device according to claim 1, wherein said housing and said at least one deformable security element are approximately cylindrical in shape.

5. The security device according to claim 1, wherein said housing is a through hole.

6. The security device according to claim 1, wherein the security device comprises first and second deformable elements each of which has at least one conducting surface, said first and second deformable elements being configured to be inserted one above the other in said housing.

7. The security device according to claim 6, wherein the first and second deformable elements are in contact through a non-conducting surface.

8. The security device according to claim 1, wherein said printed circuit comprises first and second coplanar security circuits each comprising at least one conducting security track internal to said printed circuit and interrupted at said housing and wherein said at least one deformable element has at least one conducting surface configured to close said at least one conducting track of each of said first and second coplanar security circuits when said deformable element is deformed.

9. The security device according to claim 1, wherein said at least one deformable element has a flange at one of its ends, said flange being designed to cover said housing on the surface of said printed circuit when said at least one deformable security element is inserted in said housing.

10. The security device according to claim 9, wherein:
the security device comprises first and second deformable elements each of which has at least one conducting surface, said first and second deformable elements being configured to be inserted one above the other in said housing; and
said first and second deformable elements are in contact through a conducting exchange surface when said first and second deformable elements are deformed in the housing.

11. The security device according to claim 1, wherein the security device is covered by a flexible mesh.

12. An electronic payment terminal comprising:
at least one printed circuit comprising a housing and at least one security circuit comprising at least one conducting track internal to said printed circuit and interrupted at said housing; and
at least one deformable security element configured to be inserted in the housing of said printed circuit and having at least one conducting surface configured to close said at least one internal conducting track when said deformable element is deformed in said housing.

* * * * *